Aug. 6, 1957 R. C. IMM 2,802,102

ELECTRICAL PULSE SLICING CIRCUIT

Filed June 4, 1952 2 Sheets-Sheet 1

INVENTOR
RONALD CHARLES IMM
BY [signature]
ATTORNEY

Aug. 6, 1957 R. C. IMM 2,802,102

ELECTRICAL PULSE SLICING CIRCUIT

Filed June 4, 1952 2 Sheets-Sheet 2

INVENTOR
RONALD CHARLES IMM
BY Elfonn Sunderstrom
ATTORNEY

United States Patent Office 2,802,102

Patented Aug. 6, 1957

2,802,102

ELECTRICAL PULSE SLICING CIRCUIT

Ronald Charles Imm, Wembley, England, assignor to The General Electric Company Limited, London, England Application June 4, 1952, Serial No. 291,765

Claims priority, application Great Britain June 8, 1951

8 Claims. (Cl. 250—27)

Figure 1:
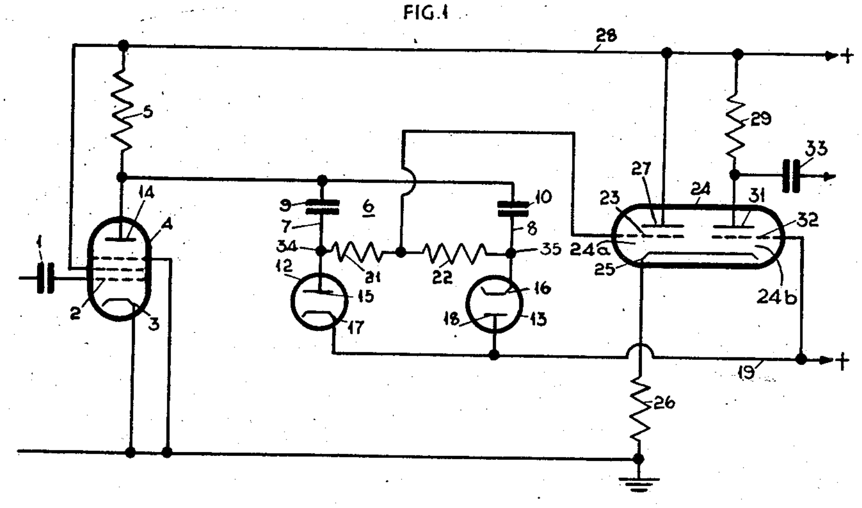

The present invention relates to electrical pulse slicing arrangements.

In signalling systems which utilise pulse code modulation, the waveform of the transmitted signal may suffer appreciable distortion during transmission, for example due to the addition of "noise." Thus in a system using binary coding in which intelligence is transmitted by a signal having either one of two levels, which may be "pulse" and "no pulse" respectively, this noise will appear as modulation on both these levels. In order to separate the required pulse signal from the noise at the receiving terminal of the system, it is known to reshape the pulse signal by effecting pulse slicing at a level betwen the two levels of the pulse code signal itself, this slicing level being chosen so that it is not crossed by peaks of the noise modulation on either of the levels of the pulse signal or at least so that the number of noise peaks which cross the slicing level is a minimum.

It is desirable that slicing shall be effected at substantially a predetermined level relative to both the levels of the pulse code signal but it will be appreciated that if the pulse code signal is supplied to the slicer through a valve amplifier, for example, the absolute value of these two levels may vary. The direct current component of the pulse code signal may be restored before slicing by means of a known clamping circuit but this is not entirely satisfactory since it merely ensures that the slicing level has a predetermined difference from one or other of the levels of the pulse code signal and does not take into account variations in the difference between those two levels.

It is one object of the present invention to provide a pulse slicing arrangement in which this difficulty is overcome.

According to the present invention, an electrical pulse slicing arrangement for use with pulse signals having N levels comprises a pair of parallel-connected paths to which is arranged to be supplied the pulse signal to be sliced, means to clamp the most positive and most negative levels of the pulse signal at points in the two paths respectively, a potential dividing network connected between the two paths, $N$—1 voltage slicers which are arranged each to effect slicing either of the pulse signal supplied from a tapping on the said potential dividing network at a predetermined level or of the pulse signal supplied to the two paths at a level determined by the steady voltage developed at a tapping point on the said potential dividing network, and means to combine the outputs of the said voltage slicers (if there are more than one), the arrangement being such that each voltage slicer supplies a component to the output signal when the supplied signal exceeds the appropriate level at which slicing is to be effected relative to the most positive and most negative levels of the pulse signal.

By way of example, each of the two paths may consist of a rectifier element and a capacity connected in series with unlike poles of the two rectifier elements connected together and one side of each of the two capacities connected together, the potential dividing network being connected between the junctions of the said rectifier elements and the said capacities in each of the two paths and each voltage slicer being arranged to slice the signal supplied from an associated tapping point on the said potential dividing network at the voltage at which the junction of the two rectifier elements is arranged to be maintained. In this case, the pulse signal at the junction of the capacity and rectifier elements in each path is clamped to the said voltage at the junction of the two rectifier elements so that the pulse signal causes the voltage at the ends of the potential dividing network to vary the same amount about that voltage.

Figure 2:
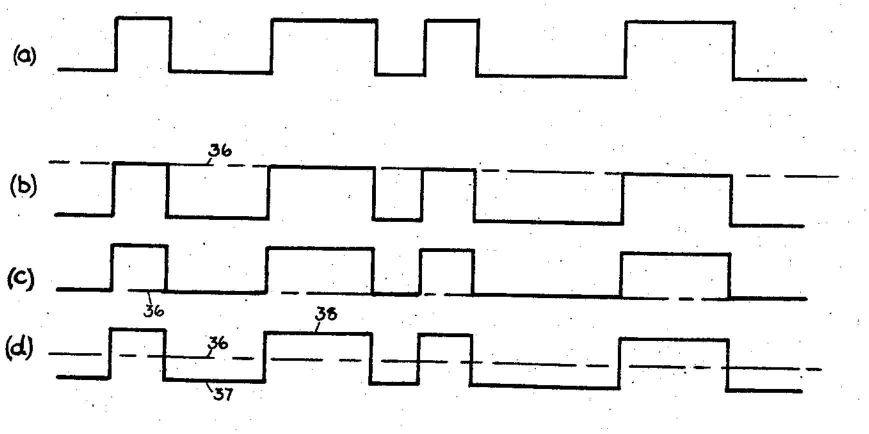
Figures 3, 4:
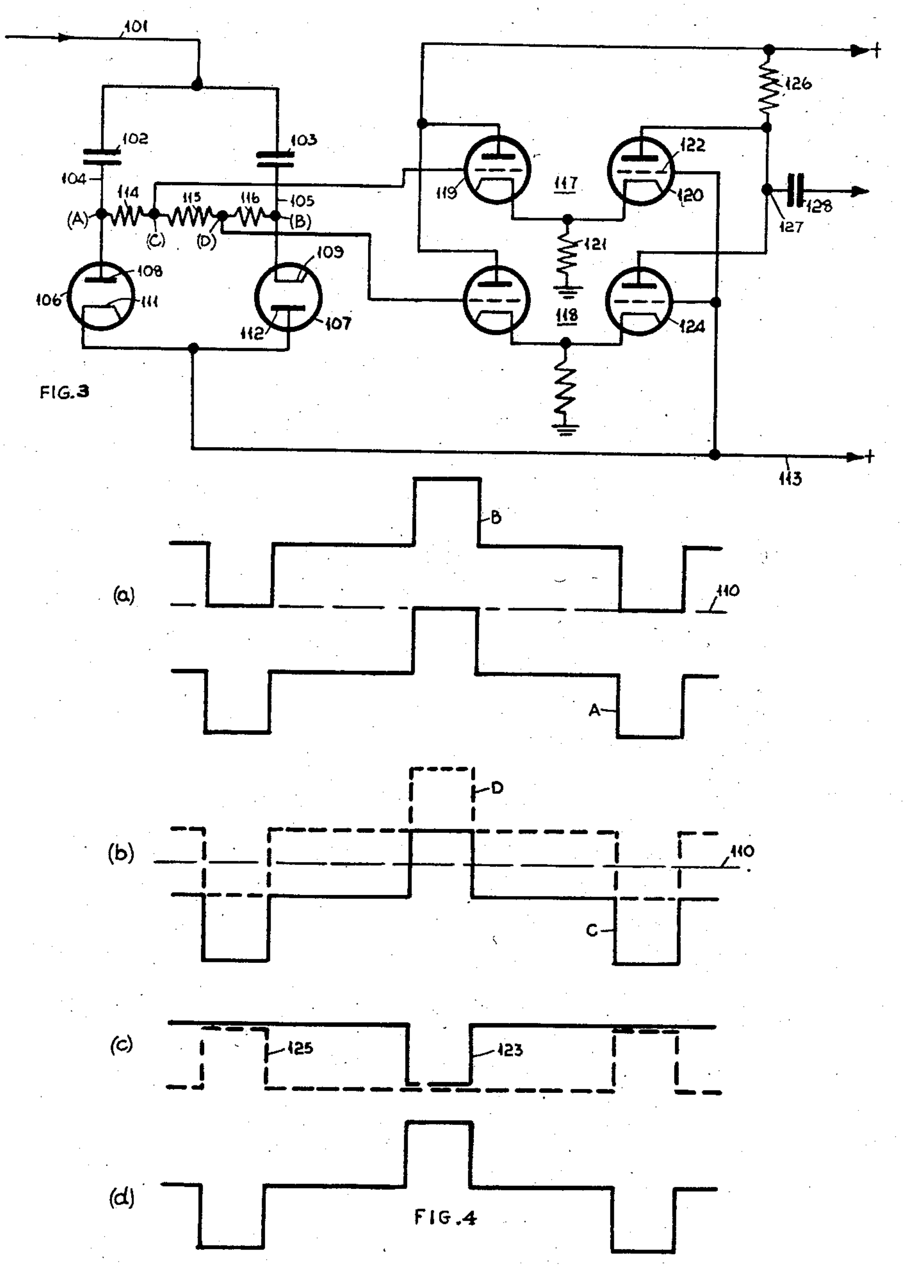

Two pulse slicing arrangements in accordance with the present invention for reshaping pulse code signals will now be described by way of example with reference to the five figures of the accompanying drawings. The first arrangement is for reshaping a pulse code signal of the two level binary type and Figure 1 of the accompanying drawings shows the circuit of the arrangement while Figure 2 shows the waveform of voltages at various points in that circuit. Figures 3 and 4 show the circuit and the voltage waveforms developed at points in that circuit of the second arrangement which is adapted to reshape a three level pulse code signal.

Referring to Figure 1 of the accompanying drawings, the pulse code signal which is to be sliced is supplied through a condenser 1 between the grid 2 and the cathode 3 of a pentode thermionic valve 4 which is arranged to operate as a conventional amplifier. The signal developed across the anode load resistor 5 of this valve is supplied to a network 6 for determining the level at which slicing is to be effected. This network 6 is formed by two parallel-connected paths 7 and 8 each of which consists of a condenser 9 or 10 and a diode thermionic valve 12 or 13 connected in series. One side of each of the two condensers 9 and 10 is connected to the anode 14 of the pentode valve 4 while the other sides of these two condensers are connected to the anode 15 and cathode 16 respectively of the two diode valves 12 and 13, the remaining two electrodes 17 and 18 of the diode valves 12 and 13 being connected together and to a supply line 19 which is arranged to be maintained at a reference voltage of about 50 volts above earth. Resistors 21 and 22 having the same resistance are connected in series between the junctions of the condensers 9 and 10 and the diode valves 12 and 13 in the two paths 7 and 8 and the junction of these two resistors 21 and 22 is connected to a control grid 23 of a double triode valve 24 which has a cathode 25 common to the two triode portions thereof.

The double triode valve 24 is arranged as a voltage slicer and has a resistor 26 connected between its cathode 25 and earth. The anode 27 of this valve 25 that is associated with the grid 23 is connected directly to a positive supply line 28 so as to be maintained at approximately 250 volts above earth while a resistor 29 is connected between that supply line 28 and the other anode 31. The grid 32 associated with the anode 31 is connected to the supply line 19 and the output of the slicer is taken from across the resistor 29 through a condenser 33.

The supply line 19 may be fed from the junction of two series-connected resistors connected between the supply line 28 and earth.

Considering now the operation of the arrangement described above, it will be appreciated that both ends of the potential dividing network formed by the two resistors 21 and 22 will be clamped to the reference voltage of the supply line 19. Thus, referring now to Figure 2, if a pulse code signal having the waveform shown in Figure 2($a$) is supplied through the condenser 1, the waveforms of the voltages developed at the points 34 and 35 will be as shown in Figures 2($b$) and 2($c$) respectively, the broken line 36 representing the voltage of the supply line 19. The voltage of the pulse signal supplied to the voltage slicer formed by the valve 24 will thus have the waveform shown in Figure 2(*d*), its two levels 37 and 38 being the same voltage on either side of the reference voltage 36. For example, if the difference between the two levels of the pulse code signal developed at the anode 14 of the pentode valve 4 is 40 volts, the point 34 will vary between 50 volts (that is to say the reference voltage) and 10 volts, while the point 35 will vary between 50 volts and 90 volts so that the pulse code signal supplied to the slicer will vary between 30 volts and 70 volts.

It will be realised that the voltage slicer formed by the valve 24 is arranged to effect slicing at the said reference voltage. Thus any signal supplied to the grid 23 outside a limited range of voltages, say from 45 to 55 volts, that contains the reference voltage will have no effect on the output developed across the resistor 29. If the voltage on the grid 23 is less than the lower limit of this range, the triode portion **24*a* will be cut off, while if it exceeds the upper limit of that range, the triode portion 24*b*** will be cut off.

In the arrangement being described the input pulse code signal is made up of a plurality of pulse intervals which each lasts for 2.4 micro-seconds and in each of which there may or may not be a pulse depending upon the intelligence being transmitted. If two or more adjacent pulse intervals each contain a pulse there is thus produced, in effect, a single pulse of increased duration as seen in Figure 2(*a*). In order to prevent any appreciable variation in the voltage levels to which the points 34 and 35 are clamped when either a plurality of adjacent pulse intervals have no pulse or alternatively each contain a pulse, it is necessary for combination of the condensers 9 and 10 and the resistors 21 and 22 to have a high time constant. Thus each of these condensers 9 and 10 may have a capacity of .01 microfarad and each of the resistors 21 and 22 a resistance of 100,000 ohms so that the said time constant is 1 millisecond which is large compared with the duration of each individual pulse interval.

The second arrangement in accordance with the present invention is adapted to reshape a three level pulse code signal in the waveform of which pulses of equal amplitude occur on either side of a predetermined level, this level and the peaks of the positive- and negative-going pulses with respect thereto constituting the three levels of the signal. A typical portion of the waveform of such a signal is shown in Figure 4(*d*) of the accompanying drawings.

Referring now to Figure 3, the pulse code signal to be sliced is fed over a path 101 to two condensers 102 and 103 which are provided in parallel-connected paths 104 and 105. Diode thermionic valves 106 and 107 are also provided in the paths 104 and 105, the anode 108 of the diode 106 being connected directly to the condenser 102 while the cathode 109 of the diode 107 is connected to the condenser 103. The cathode 111 of the diode 106 and the anode 112 of the diode 107 are connected to a supply line 113 which is arranged to be maintained at a positive potential with respect to earth.

A potentiometer which is constituted by three resistors 114, 115 and 116 is connected between the paths 104 and 105 and the resistance of this potentiometer is arranged to be high so that the time constant of the circuit formed with each of the condensers 102 and 103 is large relative to the period between adjacent pulses of the applied pulse code signal. It will be appreciated that the voltage at the point A cannot exceed that of the supply line 113 so that the waveform of the signal developed at the point A is clamped so that the peaks of the positive-going pulses are at that voltage. Thus, referring also to Figure 4(*a*), if the voltage of the terminal 113 has the value shown by the broken line 110, the voltage at the point (A) in Figure 3 will have the waveform marked A. Similarly the voltage at the point (B) in Figure 1 has the waveform marked B in Figure 4(*a*).

The voltages developed at the points (C) and (D), that is to say the junctions of the resistors 114 and 115 and of the resistors 115 and 116, are fed to voltage slicers 117 and 118 respectively. Considering the voltage slicer 117, for example, it is formed by two triode valves 119 and 120 having a cathode resistor 121 in their common cathode circuit. The valves 119 and 120 may, of course, be replaced by a double triode valve. The triode 119 acts as a cathode follower stage and feeds a signal having the waveform of the voltage at the point C into the cathode circuit of the valve 120 which has its control grid 122 connected to the supply line 113. With this arrangement the valve 120 is cut off when the voltage at the point (C) is slightly greater than that of the supply line 113 while when the voltage at the point (C) is slightly less than that of the supply line 113 the valve 119 is cut off and the valve 120 is conducting. In the arrangement being described the resistors 114 and 116 each have a value of 50,000 ohms while the resistor 115 has a value of 100,000 ohms so that the voltage at the point (C) has the waveform C shown in Figure 4(*b*) and it will be appreciated that the valve 120 will only be cut off approximately when the waveform C is above the line 110. The anode current of the valve 120 is thus shown by the curve 123 in Figure 4(*c*).

Similarly the current passed by the valve 124 in the voltage slicer 118 has the waveform 125 in Figure 4(*c*). The currents passed by the valves 120 and 124 are fed through a common resistor 126 so that the output voltage signal developed at the point 127 has a waveform that is the inverse of that obtained by adding together the waveforms 123 and 125. This resultant waveform is shown in Figure 4(*d*) and the output signal is supplied through a condenser 128.

The present invention is not restricted to arrangements for slicing signals which carry pulse code modulation but may be applied, for example, to signals carrying pulse time (phase) modulation, that is to say signals in which the intelligence to be transmitted is determined by the time position of each pulse. Moreover, the pulse signals may carry intelligence over a radio or other communication system or alternatively may be produced by other apparatus such as an electronic computer.

I claim:

1. An electrical pulse slicing arrangement comprising a pair of parallel-connected paths, an input path over which a pulse signal to be sliced is supplied to the parallel-connected paths, means to clamp to the same predetermined voltage the most positive level of the pulse signal at a point in one path and the most negative level of the pulse signal at a point in the other path while maintaining the original shape of the pulse signal, whereby twin signals are simultaneously developed in the shape of the original pulse signal, the most positive level of one of which is at the said clamping voltage and the most negative level of the other of which is at the said clamping voltage, a potential dividing network connected between the two paths, said network having a tapping point whereby said twin signals are recombined at the tapping point to develop a single signal in the shape of the original pulse signal and having a most positive level above and a most negative level below said clamping voltage, a voltage slicer, and a path for supplying to said voltage slicer the pulse signal developed at said tapping point on the potential dividing network, the voltage slicer being arranged to effect slicing of the pulse signal supplied thereto at a predetermined level in the range of said clamping voltage.

2. An electrical pulse slicing arrangement as set forth in claim 1, wherein each of the parallel-connected paths consists of a rectifier element and a capacity connected in series with unlike poles of the two rectifier elements connected together and with one side of each of the two capacities connected together, the input path supplying the signal to the junction of the two capacities and the clamping means maintaining the same predetermined voltage at the junction of the rectifier elements.

3. An electrical pulse slicing arrangement as set forth in claim 2 for use with pulse signals having two levels, wherein the resistances of the two parts of the potential dividing network between the tapping point and the ends of said network are equal.

4. An electrical pulse slicing arrangement as set forth in claim 1 for use with pulse signals having N levels, wherein N is an integer greater than two, wherein the network has plural tapping points, wherein there are $N-1$ voltage slicers, wherein there are plural paths each of which supplies to a different one of the voltage slicers the signal developed at a different one of the tapping points, and wherein means is included to combine the outputs of the voltage slicers, so that each voltage slicer supplies a component to the output signal when the signal to be sliced exceeds the appropriate level at which slicing is to be effected relative to the most positive and the most negative levels of the pulse signals.

5. An electrical pulse slicing arrangement as set forth in claim 4, wherein N is equal to three and wherein the resistances of the three parts of the potential dividing network into which said net work is divided by the tapping points, are in the ratio of 1:2:1.

6. An electrical pulse slicing arrangement as set forth in claim 2, wherein each of the rectifier elements is a diode thermionic valve and wherein the potential dividing network is connected between the junctions of the diode valves and the capacities.

7. An electrical pulse slicing arrangement as set forth in claim 1 wherein the potential dividing network includes two tapping points, wherein there are two voltage slicers, wherein there are two paths each of which supplies to a different one of the voltage slicers the signal developed at a different one of the tapping points and wherein means is included to combine the outputs of the voltage slicers so that each voltage slicer supplies a component to the output signal when the signal to be sliced exceeds the appropriate level at which slicing is to be effected relative to the most positive and the most negative levels of the pulse signals.

8. An electrical pulse slicing arrangement as set forth in claim 1 wherein the voltage slicer comprises a first and a second thermionic valve, each having at least a cathode and an anode and a control grid, said cathodes being connected in a common supply circuit, a resistance in said common supply circuit for the cathodes, the control grid of the first valve being physically connected to the tapping point on the potential dividing network, means maintaining the control grid of the second valve at the predetermined clamping voltage, a resistance connected in the anode circuit of the second valve, and an output path connected between said last-named resistance and the anode of the second valve.

References Cited in the file of this patent

UNITED STATES PATENTS

| | | |
|---|---|---|
| 2,240,420 | Schnitzer | Apr. 29, 1941 |
| 2,276,565 | Crosby | Mar. 17, 1942 |
| 2,299,945 | Wendt | Oct. 27, 1942 |
| 2,324,275 | Becker | June 13, 1943 |
| 2,355,363 | Christaldi | Aug. 8, 1944 |
| 2,406,978 | Wendt et al. | Sept. 3, 1946 |
| 2,408,079 | Labin et al. | Sept. 24, 1946 |
| 2,475,074 | Bradley et al. | July 5, 1949 |
| 2,489,297 | Labin et al. | Nov. 29, 1949 |
| 2,497,693 | Shea | Feb. 14, 1950 |
| 2,554,905 | Hawkins et al. | May 29, 1951 |